(12) United States Patent
Ionov

(10) Patent No.: US 7,149,029 B1
(45) Date of Patent: Dec. 12, 2006

(54) INTERFEROMETRIC PPM DEMODULATORS BASED ON SEMICONDUCTOR OPTICAL AMPLIFIERS

(75) Inventor: Stanislav I. Ionov, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 60 days.

(21) Appl. No.: 11/033,571

(22) Filed: Jan. 11, 2005

(51) Int. Cl.
G02F 2/00 (2006.01)
(52) U.S. Cl. .................................. 359/325
(58) Field of Classification Search ............. 359/325
See application file for complete search history.

(56) References Cited

U.S. PATENT DOCUMENTS

| | | | |
|---|---|---|---|
| 5,208,455 A | 5/1993 | Nelson et al. | 250/227.19 |
| 5,717,797 A | 2/1998 | Evans | 385/27 |
| 6,271,959 B1 * | 8/2001 | Kim et al. | 359/325 |
| 6,424,773 B1 | 7/2002 | Watanabe | 385/122 |
| 6,462,860 B1 | 10/2002 | Ionov | 359/325 |
| 6,466,703 B1 | 10/2002 | Ionov | 385/10 |
| 2003/0219195 A1 | 11/2003 | Ionov | 385/15 |
| 2005/0013543 A1 | 1/2005 | Ionov | 385/39 |
| 2006/0056845 A1 * | 3/2006 | Parsons et al. | 398/41 |

FOREIGN PATENT DOCUMENTS

| | | |
|---|---|---|
| EP | 0 521 671 A2 | 1/1993 |
| WO | 01/95526 A2 | 12/2001 |

OTHER PUBLICATIONS

U.S. Appl. No. 10/701,378, filed Nov. 3, 2003, Ionov.
U.S. Appl. No. 10/973,696, filed Oct. 25, 2004, Ionov.
Agraval, G.P., "Optical Solitons," *Nonlinear Fiber Optics*, Chapter Five, Academic Press, New York, pp. 133-152 (1995).
Bigo, S., et al., "All-Optical Fiber Signal Processing and Regeneration for Soliton Communications," *IEEE Journal of Selected Topics in Quantum Electronics*, vol. 3, No. 5, pp. 1208-1222 (Oct. 1997).
Black, H.S., *Modulation Theory*, D. Van Nostrand Company, Inc., New York, pp. 283-298 (1953).
Diez, S., et al., "Gain-Transparent SOA-Switch for High-Bitrate OTDM Add/Drop Multiplexing," *IEEE Photonics Technology Letters*, vol. 11, No. 1, pp. 60-62 (Jan. 1999).
Haus, H.A., *Waves and Fields in Optoelectronics*, Prentice-Hall, Inc., Englewood Cliffs, New Jersey, pp. 216-220 (1984).
Petermann, K., "Basic Laser Characteristics," *Laser Diode Modulation and Noise*, Kluwer Academic Publishers, Dordrecht/Boston/London, Chapter 2, pp. 4-59 (1988).
Schubert, C., et al., "160-Gb/s All Optical Demultiplexing Using a Gain-Transparent Ultrafast-Nonlinear Interferometer (GT-UNI)," *IEEE Photonics Technology Letters*, vol. 13, No. 5, pp. 475-477 (May 2001).
Schubert, C., et al., "Comparison of Interferometric All-Optical Switches for Demultiplexing Applications in High-Speed OTDM Systems," *Journal of Lightwave Technology*, vol. 20, No. 4, pp. 618-624 (Apr. 2002).
Wang, D., et al., "Nonlinear Optical Loop Mirror Based on Standard Communication Fiber," *Journal of Lightwave Technology*, vol. 15, No. 4, pp. 642-646 (Apr. 1997).

* cited by examiner

*Primary Examiner*—John D. Lee
(74) *Attorney, Agent, or Firm*—Ladas & Parry LLP

(57) ABSTRACT

An optical demodulator for use as a pulse position demodulator. The demodulator has one or more semiconductor optical amplifiers coupled to receive an optical signal to be demodulated at first end thereof and for receiving optical control pulses at a second end therefore, the optical signal to be demodulated and the optical control pulses counter-propagating in said one or more semiconductor optical amplifiers in order to determine a delay or phase shift there between; and a detector coupled to the one or more semiconductor optical amplifiers for recovering, as an electrical output signal, the delay or phase shift in the optical signal.

15 Claims, 3 Drawing Sheets

INTERFEROMETRIC PPM DEMODULATORS BASED ON SEMICONDUCTOR OPTICAL AMPLIFIERS

TECHNICAL FIELD

This disclosure relates to pulse position modulation demodulators.

BACKGROUND INFORMATION

Many satellite and terrestrial optical communication systems require transmission of analog optical signals. A straightforward way to address this need is to modulate the amplitude (AM) of an optical carrier. This approach, however, suffers from a poor Signal to Noise Ratio (SNR). It is well known that broadband modulation schemes, which utilize higher bandwidth than that of the transmitted waveform, may improve the SNR over that achieved with AM. Pulse position modulation (PPM) is one of such techniques. In PPM, a shift in the pulse position represents a sample of the transmitted waveform, as shown in FIG. 1. It can be shown that for a given power, $SNR_{PPM} \propto SNR_{AM}(t_p/\tau)^2$, where $t_p$ is the spacing between un-modulated pulses and $\tau$—the pulse duration, respectively. See H. S. Black, Modulation Theory, D. Van Nostrand (1953).

The implementations of PPM for optical communications require new techniques for generating trains of optical pulses whose positions are shifted in proportion to the amplitude of a transmitted waveform. Typically a bandwidth of $\Delta f=1–10$ GHz and higher is of interest for inter-satellite communications. Since pulse repetition frequencies (PRF) of $1/t_p > 2 \Delta f$ are required for sampling a signal of bandwidth $\Delta f$, GHz trains of picosecond (ps) pulses are required for realizing the advantages of PPM. For example, an optical inter-satellite link designed to transmit waveforms with $\Delta f=10$ GHz bandwidth requires sampling rates of $PRF=1/t_p \geq 2\Delta f=20$ GHz. By employing 1–2 ps-long optical pulses, a 30 dB gain is realized over an AM system with equal optical power.

Optical PPM offers large SNR improvements in power-starved optical links. This technology, however, requires development of new types of optical PPM receivers. One optical PPM receiver based on top hat pulse generation (THPG) has been proposed. See S. I. Ionov, "Detection of optical analog PPM streams based on coherent optical correlation", U.S. Pat. No. 6,462,860. See also S. I. Ionov, "Optical top hat pulse generator", US Published Patent Application No. 2003/0219195, and "PPM demodulator based on PM NOLM with improved conversion efficiency", U.S. patent application Ser. No. 10/735,071 filed Dec. 12, 2003 which is based upon 60/488,540 filed Jul. 18, 2003.

The present disclosure describes a significantly simpler approach to PPM decoding. Because of its simplicity, the proposed device is expected to be more robust. The technology alluded to above utilizes fiber-based designs. The major drawback of the fiber-based design is in its complexity. The previous receivers were based on non-linear optical loop mirrors (NOLM) that require careful balancing and adjustments. They also need a number of EDFAs and optical filters with flat-dispersion.

The reader is also directed to U.S. patent application Ser. No. 10/701,378 filed Nov. 3, 2003 which relates to a PPM demodulator based on the gain dynamics of a semiconductor optical amplifier (SOA).

This disclosure relates to a different implementation of a PPM demodulator based on interferometric schemes involving SOAs.

DETAILED DESCRIPTION

Figure 1:
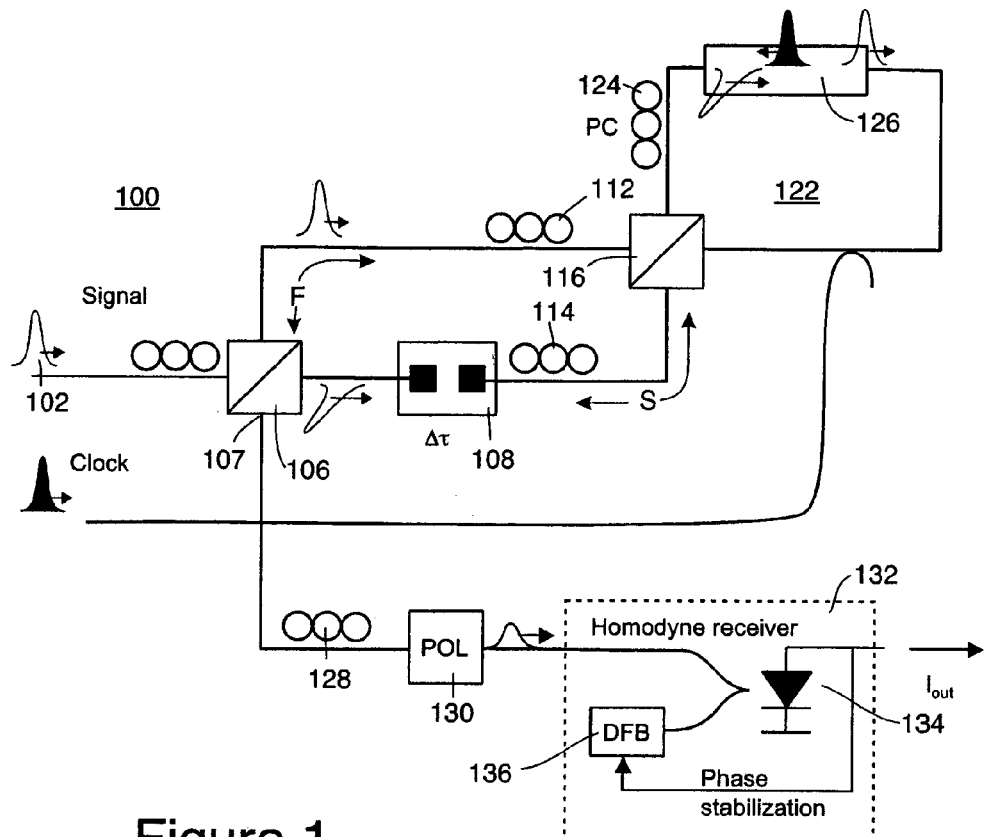
FIG. 1 is a schematic diagram of an interferometric all-optical PPM demodulator based on UNI (Ultrafast Non-linear Interferometer) architecture.
Figure 3:
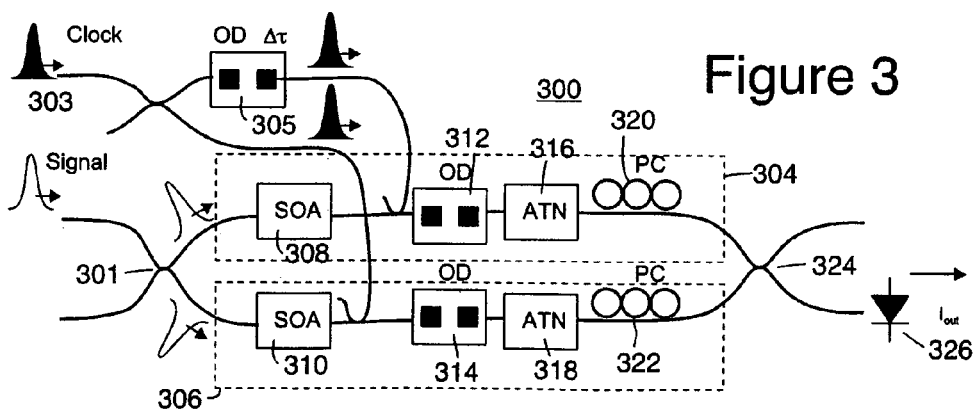
FIG. 3 is a schematic diagram of an interferometric all-optical PPM demodulator based on MZI architecture.
Figure 4:
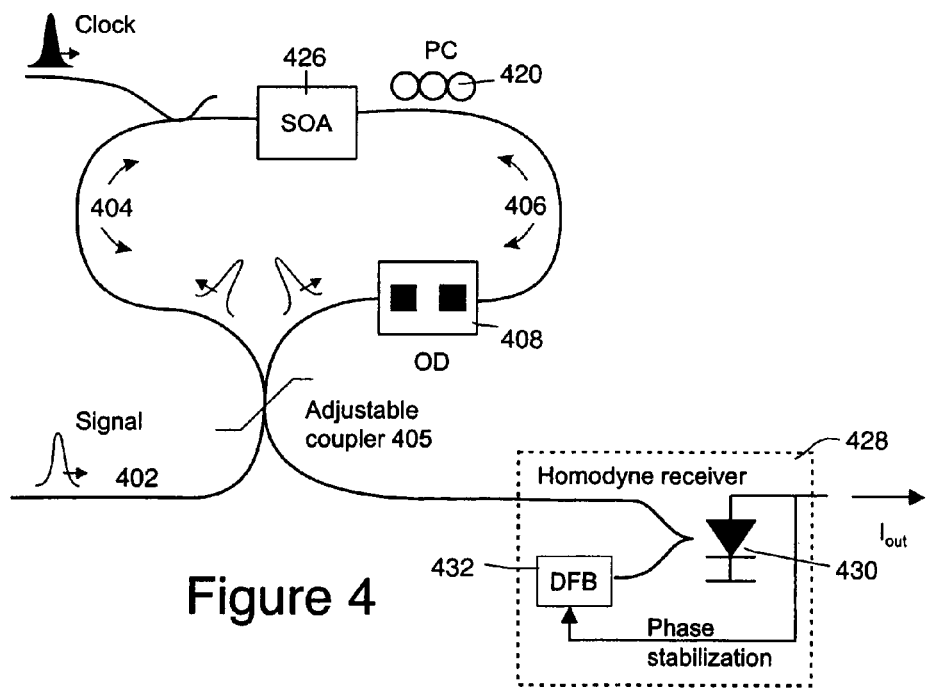
FIG. 4 is a schematic diagram of an interferometric all-optical PPM demodulator based on SLALOM (Semiconductor Laser Amplifier in a Loop Mirror) architecture.

Schematic diagrams of interferometric PPM demodulators based on SOA are shown in FIGS. 1, 3 and 4. The pictured architectures are somewhat similar to ultra-fast all-optical switches based on the UNI (Ultrafast Non-linear Interferometer), the MZI (Mach-Zehnder Interferometer), and the SLALOM (Semiconductor Laser Amplifier in a Loop Mirror), respectively. See C. Schubert, J. Berger, S. Diez, H. J. Ehrke, R. Ludwig, U. Feiste, C. Schmidt, H. G. Weber, G. Topchyski, S. Randel, and K. Petermann, "Comparison of Interferometric All-Optical Switches for Demultiplexing Applications in High-Speed OTDM Systems", *J. Lightwave Tech.*, vol. 20 (4), 2002, pp. 618–624. The difference between the architectures of the PPM demodulators shown in FIGS. 1 and 3 and the corresponding ultra-fast all-optical switches is that the control pulse counter-propagates with respect to one of the interfering signal pulses. Also, operating conditions have been selected for achieving linear PPM (ramp-like) response. This contrasts with typical switching applications that seek to achieve a rectangular switching window with vertical edges and also attempt to maximize the contrast between the ON and OFF states.

Preferably, the SOAs in all these demodulator embodiments operate in the gain-transparent mode. See S. Diez, R. Ludwig, and H. G. Weber, "Gain-transparent SOA switch for high-bitrate OTDM add/drop multiplexing," *IEEE Photon. Technol. Lett.*, vol. 11 (1), 1999, pp. 60–62. In this mode of operation, the wavelength of control (or clock) pulses is in the spectral gain region of SOA (e.g., 1.3 mm), whereas the wavelength of the signal pulses is longer, corresponding to photon energy below the band-gap of the semiconductor material. Alternatively, both wavelengths may be in the gain region. In this case, the SOA should be current-biased to near-transparent conditions (i.e. with no significant gain or loss).

In the disclosed UNI demodulator 100, the incoming signal pulses 102 are polarized at 45 degrees with respect to a first polarizing beam splitter (PBS) 106, so that they are split into two orthogonally-polarized beams of equal power that pass along optical legs F and S from the output of splitter 106 towards a second PBS 116. The optical lengths of legs F and S are preferably identical except for an intentional delay ($\Delta\tau$) inserted by element 108 (which may be a thickness of glass) in the relatively slower leg S. The delay ($\Delta\tau$) between the orthogonally-polarized pulses at the second PBS 116 is set close to the clock period. The polarization controllers 112, 114 in each leg F, S ensure that both beams are combined by the second PBS 116 and launched into the SOA loop 122 in the clockwise direction in the depicted embodiment. As a result, both signal beams enter the SOA from one end thereof and move in a common direction through the SOA, while the control or timing pulse on optical path 118 enters the SOA from its opposite end. The polarization controller 124 in the SOA loop 122 assures that the faster signal component, which arrived via the faster leg F, returns to beam splitter 106 via the slower leg S and the slower signal component, which arrived in the SOA loop 122 via the slower leg S, returns via the faster leg F. Thus, the delay between the two polarization components is cancelled at the output of the interferometer.

In an alternative embodiment, the first polarizing beam splitter 106 and the unequal arms F, S before the second beam splitter 116 may be replaced by a single section of a PM fiber oriented at 45 degrees with respect to the polarization of the incoming signal pulses. See C. Schubert, S. Diez, J. Berger, R. Ludwig, U. Feiste, H. G. Weber, G. Topchyski, K. Petermann, and V. Krajinovic, "160 Gbit/s all-opticaldemultiplexing using a gain-transparent Ultrafast non-linear interferometer (gt-UNI)," *IEEE Photon. Technol. Lett.*, vol. 13, 2001, pp. 475–477.

Figure 2:
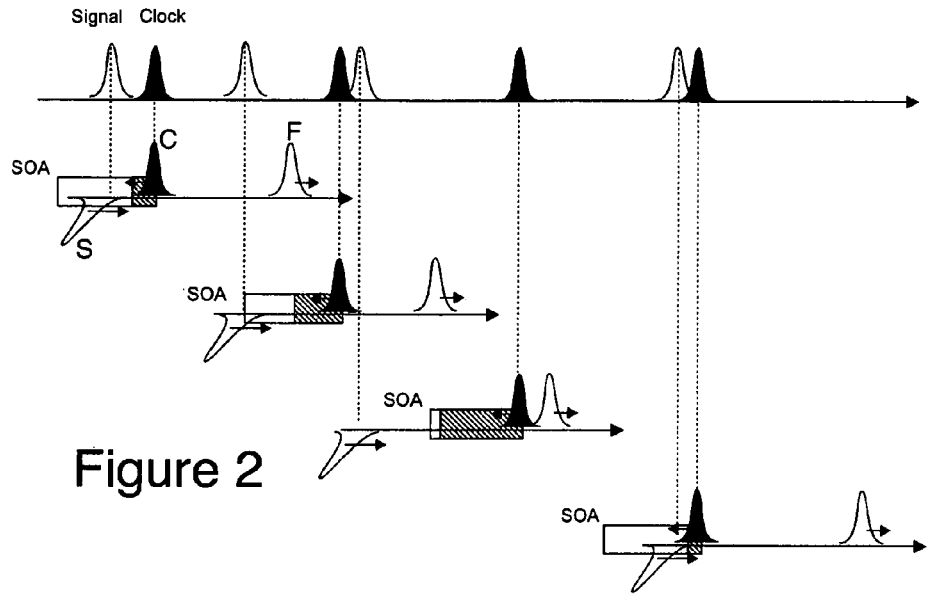
FIG. 2 is a timing diagram of clock (i.e., control) and signal pulses in the SOA of the UNI and MZI (Mach-Zehnder Interferometer) embodiments of a demodulator.

The operation of the UNI PPM demodulator 100 is better understood by considering the timing diagram of signal and clock optical pulses in the SOA. See FIG. 2. In FIG. 2 four different possible timing situations are depicted (top to bottom in the figure). In each situation the SOA is shown with two signal pulses, both traveling in the same direction through the SOA, with a clock or control signal (shown in black) propagating in an opposite direction through the SOA. The right most signal pulse or component is depicted upright and it is the signal pulse that arrives earlier since it traveled via the faster leg F. The left most signal pulse depicted for each timing situation arrives later since it traveled via the slower leg S. The control or timing pulse is depicted in black to differentiate it from the two signal pulses. In the four timing situations depicted by this figure the timing pulse goes from being relatively close to the slow leg signal pulse (S) to being relatively close to the fast leg signal pulse (F) to being very close to the slow leg signal pulse (S) when viewing the four situations from top to bottom in FIG. 2. Of course, those skilled in the art will appreciate that these four timing situations are merely exemplary of the possible timing situations that will occur in these optical circuits.

In FIG. 2, the delayed signals are depicted in a bent fashion which represents the fact that the slow component of the signal is orthogonal to that of the fast one in a UNI PPM demodulator.

The timing of clock versus signal pulses in the SOA is set in such a way that minimum and maximum delays between the slow signal pulse or component and the corresponding clock or control pulse (at the moment when the clock or control pulse enters the SOA 126) represent, respectively, the minimal and maximal values of the transmitted waveform. In this arrangement, the fast component or pulse (F) of the signal always exits the SOA 126 before the corresponding clock pulse enters into it. The crosshatched region in the SOA has a length that is equal to one half the distance between the slow leg component or pulse and the control pulse at the moment when the control pulse enters the SOA. The total length of the SOA 126 is preferably chosen to be sufficiently long that at a maximum delay between the signal and clock pulses, the latter collides with the slow component or pulse of the signal before exiting the SOA 126. For example, for a 10 G/s pulse rate, $L \geq Tc/2n = 4.5$ mm, where $T=100$ ps is the pulse period and $n=3.3$ is the index of refraction.

The clock pulse changes the carrier density in the SOA (in the crosshatched region), which affects the phase shift of the slow signal component with respect to the fast one (the cross hatched lines in the SOA depict the length along the SOA that the control or clock pulse has traveled when it encounters (collides with) the slow signal component or pulse and thus depicts where the carrier density of the SOA has been changed by the clock or control pulse when the collision occurs). The length of the crosshatched region is proportional to the relative phase shift. As a result, when the two polarized signal components recombine at the output 107 of beam splitter 106, they do so into a different polarization state (which is determined by their relative phase shift), and a portion of the signal pulse will pass through the output polarizer 130. As seen from FIG. 2, the length of the SOA, which is affected by the clock pulse and sampled by the slow signal component or pulse (S), is proportional to the delay between the signal and the clock. Therefore, the corresponding phase shift between the two polarized components of the signal is also proportional to the delay, assuming that the clock pulse is not attenuated significantly in the SOA. If the latter condition is not satisfied, the SOA should be current-biased for near-transparency at the clock wavelength as previously mentioned.

The optical field amplitude after the polarizer is $E=E_o(\cos(\omega t+\phi)\cos(\alpha)+\cos(\omega t)\sin(\alpha))$, where $\phi$ is the relative phase shift acquired by the slow signal component in the SOA 126 and $\alpha$ is the tilt of the output polarizer 130 with respect to the principal polarization direction of the signal. The polarization controller 128 and the polarizer 130 at the output of the interferometer are adjusted to have zero signal transmission at minimal delay between the signal and the clock pulses. In this case, $\alpha=-\pi/4$ and $E/E_o \propto \sin(\phi/2) \approx \phi/2$. The electric amplitude of the signal is converted to electrical current in a homodyne detector 132, which beats the output signal against a phase-locked local oscillator 136 on a photodiode 134. The local oscillator 136 is preferably implemented by a DFB laser diode. Since the output current of the homodyne receiver 132 is proportional to the amplitude of the output signal (in the linear regime), it is also proportional to the phase shift $\phi$, which is, in turn, proportional to the delay between the signal and clock optical pulses. Therefore, the electrical output of the UNI demodulator 100 depicted in FIG. 1 is proportional to the delay between the signal and clock pulses. In an MZI PPM demodulator 300 as shown in FIG. 3, the signal is preferably split by a 3 dB coupler 301 into two components that travel in two separate legs 304, 306 (each leg has the same optical length in this embodiment, but for the existence of the intentional optical delay 312, 314) before they are recombined by a second 3 dB coupler 324. A clock pulse 303 induces two non-linear index changes in the two legs 304, 306 of the interferometer that depend on the relative delays between the counter-propagating control and signal pulses in each leg. The control pulse in one leg 304 of the interferometer is delayed (by optical delay 305) by about one clock period with respect to that in the other leg 306, and the length of each SOA 308, 310 is traveled by optical pulses in one half of the clock period. The clock (i.e., control) pulse is aligned similarly to the alignment in the UNI demodulator. In one leg, the control pulse collides with the corresponding signal pulse at the entrance of the SOA if maximum PPM delay is present. In this configuration, the phase shift experienced by the signal pulse in the first leg 304 is proportional to the delay between the signal and the clock. This operation is similar to that in the UNI demodulator (see again the timing diagram of FIG. 2) although now two signal pulses in the two legs have the same polarization. Also, the signal pulses may be aligned in time whereas control pulses are split. However, the relative pulse positions of control and signal pulses are similar to that of the previously described UNI PPM demodulator embodiment. The control or timing pulse in the other leg 306 always enters the SOA after the corresponding signal pulse has already exited, thereby imprinting no phase shift on the signal pulse. Therefore, the differential phase shift between the two signal components is proportional to the PPM delay between the signal and control pulses.

Alternatively, the signal pulses in one leg 304 or 306 could be delayed instead of delaying the corresponding control pulses as described above.

The MZI demodulator is balanced in the absence of clock pulses either for a 50/50 split at the output, or for zero output from the detector leg (see FIG. 3). In the first case (the 50/50 split), a simple photodiode 326 provides linear conversion of the PPM phase shift into the output current. In the second case (the zero output), a homodyne detector is utilized for linear conversion, similar to the UNI embodiment of FIG. 1. For illustrative purposes, only the first case (the 50/50 split embodiment with the simple photodiode) is shown in FIG. 3 since an exemplary homodyne detector is already shown in connection with the embodiment of FIG. 1.

To balance the interferometer, an optical delay (OD) 312, 314, an attenuator (ATN) 316, 318 and a polarization controller (PC) 320, 322 are preferably used in each leg 304, 306. The optical delays 312, 314 are optional—they may be needed if bulk optics and fibers are used and/or if there exists a temperature imbalance between the two legs to assure correct timewise pulse alignment. In addition, active phase stabilization must be implemented for proper operation so it may be necessary to also include a phase shifter in at least one of the legs 304, 306. One of the advantages of the SLALOM and UNI embodiments is that timewise pulse alignment is achieved inherently by the configurations of the light paths employed so that optical delay devices in each leg, comparable to ODs 312, 314, and/or phase shifters are ordinarily not needed in those embodiments.

FIG. 4 depicts the SLALOM demodulator embodiment 400. In this embodiment incoming signal pulses 402 are split by an adjustable 3 dB input-output coupler 405 into two components, one propagating in the clockwise direction in the loop 404 depicted in the figure (so that the signal initially enters leg 404) and the other in the counterclockwise direction in FIG. 4 (so that the counterclockwise signal initially enters leg 406). In this embodiment the SOA 426 is placed timewise asymmetrically in loop 402 due to the presence of an optical delay element 408 in leg 406, so that the counter-propagating pulses reach the SOA 426 with an intentional delay equal to the clock period ($\Delta\tau$). Otherwise, without the intentional delay, both legs have the same amount of delay associated therewith. Without a control pulse, the loop is balanced for 100% reflection by a PC 420 and the adjustable 3 dB coupler 406. The length of the SOA is chosen so as to be crossed by the counter-propagating optical pulses in one half of the clock period (0.5·$\Delta\tau$).

Figure 5:
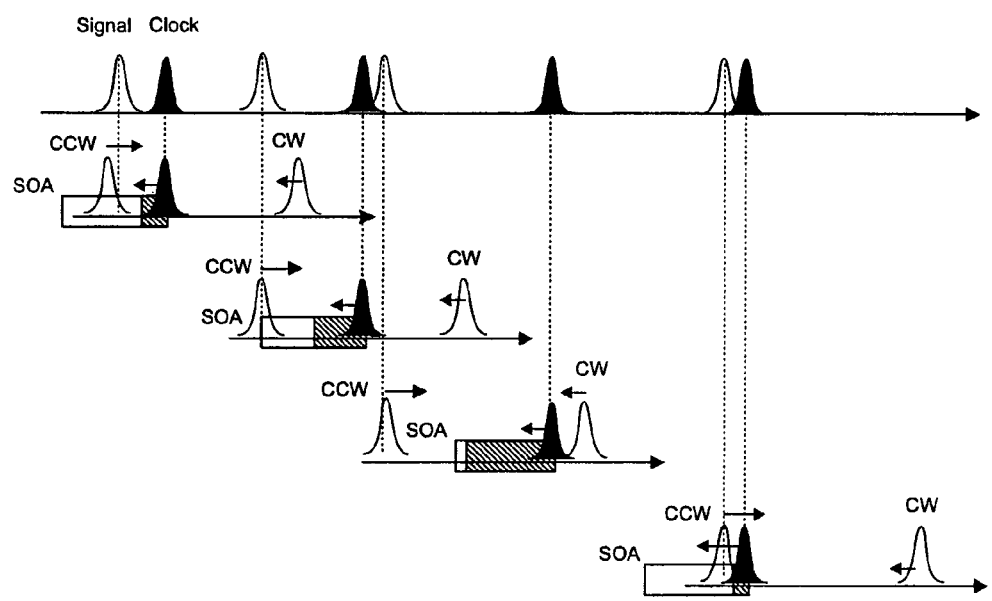
FIG. 5 is a timing diagram of clock (i.e., control) and signal pulses in SOA of the SLALOM demodulator.

A timing diagram explaining the operation of the SLALOM demodulator is shown in FIG. 5. The clock pulse always arrives at the SOA 426 prior to the corresponding co-propagating signal pulse. As a result, the co-propagating signal pulse in the clockwise (CW) direction in the depicted loop always acquires maximum phase shift. (This is opposite to the operation of the UNI or MZI demodulator embodiments shown in FIG. 2, where the fast component never acquires a phase shift in the disclosed embodiments.) On the other hand, the counter-propagating signal pulse—in the counterclockwise (CCW) direction in the depicted loop—acquires a phase shift that is proportional to the PPM delay between the signal and clock pulses (similar to the operation of the disclosed UNI and MZI demodulators). Therefore, the differential phase shift acquired by the two signal components is proportional to $\phi \propto 1-t_{PPM}$, i.e. proportional to the negative of the transmitted waveform.

The output optical field of the SLALOM demodulator 400 is proportional to $\sin(\phi) \approx \phi$. The electric amplitude of the signal is converted to electrical current in a homodyne detector 428, which beats the output signal against a phase-locked local oscillator 432 on a photodiode 430. Since the output current of the homodyne receiver is proportional to the amplitude of the output signal (in the linear regime), it is also proportional to the phase shift $\phi$, which is, in turn, proportional to the negative of the delay between the signal and clock optical pulses. Therefore, the electrical output of the SLALOM PPM demodulator 400 is proportional to the negative of the delay between the signal and clock pulses. The optical paths in the previously described embodiments are assumed to be in free space. However, after accounting for path lengths, the paths could be in other media such as optical fibers. If optical fibers are utilized and the delays in the optical fibers are appropriately adjusted, then the optical delay devices, such as element 108 in the embodiment of FIG. 1, may be omitted.

Having described this technology in connection with certain embodiments thereof, modification will now doubtlessly suggest itself to those skilled in the art. As such, the present invention is not to be limited to the disclosed embodiments except as specifically required by the appended claims.

What is claimed is:

1. An optical demodulator comprising:
   a. one or more semiconductor optical amplifiers coupled to receive an optical signal to be demodulated at first end thereof and for receiving optical control pulses at a second end therefore, the optical signal to be demodulated and the optical control pulses counter-propagating in said one or more semiconductor optical amplifiers in order to determine a delay or phase shift there between; and
   b. a detector coupled to the one or more semiconductor optical amplifiers for recovering, as an electrical output signal, the delay or phase shift in the optical signal to be demodulated.

2. The optical demodulator of claim 1 wherein the detector is a homodyne detector.

3. The optical demodulator of claim 1 wherein the optical signal is split into two versions thereof, one of the split signals arriving relatively faster at the one or more semiconductor optical amplifiers and the other of the split signals arriving relatively slower at the one or more semiconductor optical amplifiers.

4. The optical demodulator of claim 3 wherein the split signals are applied to a single semiconductor optical amplifier at its first end to thereby counter-propagate with the control pulses applied at the second end thereof, the split signals being differentiated from each other by having different polarizations in said single semiconductor optical amplifier.

5. The optical demodulator of claim 4 further including first and second polarization beam splitters for splitting and recombining the split optical signals, the first polarization beam splitter splitting the optical signal into its two split versions, a delay element coupled to the first polarization beam splitter for delaying the relatively delayed optical signal and the second polarization beam splitter recombining the delayed and undelayed split signals before the delayed and undelayed signals are applied to the first end of the single semiconductor optical amplifier.

6. The optical demodulator of claim 5 wherein the delayed and undelayed signals emerge from the second end of the single semiconductor optical amplifier and thereafter are applied to the second polarization beam splitter for splitting the delayed and undelayed signals, the undelayed signals being directed to said delay element for imposing the same delay as was imposed on the aforementioned delayed signals whereby the heretofore undelayed signals acquire the same amount of delay as the delayed signals, the delayed and heretofore undelayed signals being recombined by the first polarization beam splitter before being directed to the detector.

7. The optical demodulator of claim 3 wherein the split signals are applied to a single semiconductor optical amplifier respectively at its first and second ends to thereby counter-propagate with each other in said single semiconductor optical amplifier, the split signals applied at the first end of the single semiconductor optical amplifier also counter-propagating with control pulses applied at the second end thereof, one of the split signals applied at one end of the single semiconductor optical amplifier being delayed by a delay device relative to the other one of the split signals applied at the other end of the single semiconductor optical amplifier.

8. The optical demodulator of claim 7 wherein the split signals emerge from opposite ends of the single semiconductor optical amplifier, the heretofore undelayed optical signals being thereafter delayed by said delay device to thereby acquire the same delay as the previously delayed signals before both the previously delayed signal and the heretofore undelayed optical signals are recombined by said splitter for transmission to said detector.

9. The optical demodulator of claim 8 wherein the optical signals are split and recombined by an adjustable coupler.

10. The optical demodulator of claim 1 wherein the optical signal is split into two versions thereof, the split signals arriving at a common moment in time at two separate semiconductor optical amplifiers and wherein the optical control pulses comprise two versions thereof, one being delayed relative to the other, wherein relatively delayed control pulses are applied to the second end of one of the two separate semiconductor optical amplifiers and relatively undelayed control pulses are applied to the second end of the other of the two separate semiconductor optical amplifiers.

11. A method for demodulating an optical signal, comprising providing two interfering signal pulses, providing a control pulse, one of the interfering signal pulses acquiring a phase shift which is proportional to the delay between it and the control pulse; and recovering the phase shift in an interferometer to convert it to an electrical signal.

12. The method of claim 11 wherein the interferometer is an Ultrafast Non-linear Interferometer (UNI).

13. The method of claim 11 wherein the interferometer is a Mach-Zehnder Interferometer (MZI).

14. The method of claim 11 wherein the interferometer is a Semiconductor Laser Amplifier in a Loop Mirror (SLA-LOM).

15. The method of claim 11 wherein the interferometer includes a semiconductor optical amplifier and wherein the control pulse changes a carrier density in a portion of the semiconductor optical amplifier which affects a phase shift of a slow signal component with respect to a fast signal component, the slow pulse colliding with a control pulse in the semiconductor optical amplifier, the slow component traveling in different carrier densities in said semiconductor optical amplifier immediately before and after the collision resulting from the slow pulses colliding with the control pulse.

* * * * *